(12) United States Patent
Udayakumaran et al.

(10) Patent No.: US 9,329,867 B2
(45) Date of Patent: May 3, 2016

(54) REGISTER ALLOCATION FOR VECTORS

(71) Applicant: QUALCOMM Incorporated, San Diego, CA (US)

(72) Inventors: Sumesh Udayakumaran, San Diego, CA (US); Se Jong Oh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/494,240

(22) Filed: Sep. 23, 2014

(65) Prior Publication Data

US 2015/0193234 A1     Jul. 9, 2015

Related U.S. Application Data

(60) Provisional application No. 61/925,162, filed on Jan. 8, 2014.

(51) Int. Cl.
*G06F 9/30* (2006.01)
*G06F 9/45* (2006.01)

(52) U.S. Cl.
CPC .............. *G06F 9/3013* (2013.01); *G06F 8/441* (2013.01)

(58) Field of Classification Search
CPC .................................................. G06F 9/30036
USPC ................................................ 717/136–167
See application file for complete search history.

(56) References Cited

U.S. PATENT DOCUMENTS

| | | | | |
|---|---|---|---|---|
| 5,530,866 | A * | 6/1996 | Koblenz et al. ............... | 717/144 |
| 5,930,510 | A * | 7/1999 | Beylin et al. .................. | 717/161 |
| 5,946,491 | A * | 8/1999 | Aizikowitz et al. ........... | 717/158 |
| 6,009,272 | A * | 12/1999 | Goebel .......................... | 717/152 |
| 6,122,656 | A * | 9/2000 | Witt ............................... | 718/100 |
| 7,185,329 | B1 | 2/2007 | Verbitsky | |
| 8,266,603 | B2 | 9/2012 | Inagaki et al. | |
| 2004/0003385 | A1* | 1/2004 | Kushlis ......................... | 717/158 |
| 2008/0005722 | A1 | 1/2008 | Matsuzaki | |
| 2011/0161945 | A1 | 6/2011 | Kalogeropulos et al. | |

(Continued)

OTHER PUBLICATIONS

Callahan, David, and Brian Koblenz. "Register allocation via hierarchical graph coloring." ACM SIGPLAN Notices 26.6 (1991), pp. 192-203.*

(Continued)

*Primary Examiner* — Satish Rampuria
(74) *Attorney, Agent, or Firm* — Shumaker & Sieffert, P.A.

(57) ABSTRACT

This disclosure describes techniques for allocating registers in a computing system that supports vector physical registers. The techniques for allocating registers may allocate physical registers to vector virtual registers based on priority information that is indicative of a relative importance of allocating respective vector virtual registers as vectors rather than scalars. The techniques for allocating registers may involve allocating physical registers to the vector virtual registers in an order that is determined based on the priority information. The techniques for allocating registers may further involve, in response to determining that no vector physical registers are available to assign to a vector virtual register, determining whether to perform vector-scalar live interval splitting for the vector virtual register, spill other register live intervals into a memory in order to allocate the vector virtual register as a vector, or assign scalar physical registers to the vector virtual register based on the priority information.

30 Claims, 7 Drawing Sheets

(56) References Cited

U.S. PATENT DOCUMENTS

2011/0219364 A1* 9/2011 Makarov .................. 717/151
2013/0024647 A1* 1/2013 Gove .................. G06F 12/084
                                                          711/207
2013/0086364 A1   4/2013 Gschwind et al.
2013/0275700 A1  10/2013 Wang et al.

OTHER PUBLICATIONS

Rau, B. Ramakrishna, et al. "Register allocation for software pipelined loops." ACM SIGPLAN Notices. vol. 27. No. 7. ACM, 1992, pp. 283-299.*

Nickerson, Brian R. "Graph coloring register allocation for processors with multi-register operands." ACM SIGPLAN Notices 25.6 (1990), pp. 40-52.*

Munshi, et al., "The OpenCL Specification", Version: 2.0, Nov. 1, 2014, 286 pp.

Munshi, "The OpenCL C Specification", Version: 2.0, Nov. 1, 2014, 201 pp.

Munshi, "The OpenCL Extension Specification", Version: 2.0, Nov. 1, 2014, 165 pp.

Chow F C et al., "The Priority-Based Coloring Approach to Register Allocation", ACM Transactions on Programming Languages and Systems, New York, NY, US, vol. 12, No. 4, Oct. 1, 1990, pp. 501-536, XP000255876.

International Search Report and Written Opinion from International Application No. PCT/US2014/069142 dated Mar. 12, 2015, 16 pps.

Koseki A., et al., "Preference-Directed Graph Coloring," Proceedings of the ACM SIGPLAN 2002 Conference on Programming Language Design and Implementation, PLDI '02, Jan. 1, 2002, pp. 33-44, XP055173331, New York, USA DOI: 10.1145/512529.512535, ISBN: 978-1-58-113463-6.

Lueh G.Y., et al., "Fusion-Based Register Allocation," ACM Transactions on Programming Languages and Systems, vol. 22 (3), May 1, 2000, pp. 431-470, XP055173335, ISSN: 0164-0925, DOI:10.1145/353926.353929.

Raghavan P., et al., "SARA: Stream Register Allocation," Proceedings of the 7th IEEE/ACM International Conference on Hardware/Software Codesign and System Synthesis, Codes+ISSS '09, Oct. 11, 2009, pp. 41-50, XP055173328, New York, USA, DOI: 10.1145/1629435.1629442, ISBN: 978-1-60-558628-1.

Second Written Opinion from International Application No. PCT/US2014/069142, dated Dec. 22, 2015, 8 pp.

* cited by examiner

1 Register solution (R0)
X (R0) =
Spill R0, Mem[#0]
Y R0 =
...... = Y (R0)
Load R0 = Mem[#0]
...... = X (R0)

2 Register solution (R0, R1)
X (R0) =
Y (R1) =
...... = Y (R1)
...... = X (R0)

FIG. 3

```
Kernel foo(read_only image1d_t input, float2
results){
    ........
    float4 color = read_image(...)
    ........
    t = x+ 2;
    ........
    For (........){
        results[i] =
    }
    ........
}
``` img_read (r1.x, r1.y, r1.z, r1.w), r1.x, s#0, t#0;
....
add r1.x, r0.x, 2
store mem[r0.x], (r1.w,r2.x)

Multiple consecutive registers (r1.xyzw), (r1.w,r2.x)

FIG. 4 img_read (r1.x, r1.y, r1.z, r1.w), r1.x, s#0, t#0;
...
store mem[r0.x], (r1.w,r2.x)

vs img_read (r1.x, r1.y, r1.z, r1.w), r1.x, s#0, t#0;
...
store mem[r0.x], r0.z
store mem[r0.x], r1.w

FIG. 5

```
img_read (r1.x, r1.y, r1.z, r1.w), r1.x, s#0, t#0;
...
store mem[r0.x], (r2.x, r2.y)
```

⇧

```
img_read (r1.x, r1.y, r1.z, r1.w), r1.x, s#0, t#0;
...
mov  r1.x, r1.z
mov  r1.y, r0.w
store mem[r0.x], (r1.x, r1.y)
```

FIG. 7

REGISTER ALLOCATION FOR VECTORS

This application claims the benefit of U.S. Provisional Application No. 61/925,162, filed Jan. 8, 2014, the entire content of which is incorporated herein by reference.

TECHNICAL FIELD

This disclosure relates to compilers, and more particularly, to register allocation techniques for use in compilers.

BACKGROUND

Compilers may be used to translate a program that is written in a first programming language to an equivalent program that conforms to a second programming language different than the first programming language. The program code that is written in the first programming language may be referred to as source code, and the program code that is written in the second programming language may be referred to as target code.

Oftentimes, the source code for a compiler is written in a high-level programming language and the compiler translates the high-level source code into a target code that corresponds to a low-level programming language, such as, e.g., assembly language code or object code. In such examples, the high-level programming language may not specify how the program variables are stored in the physical registers of the underlying processor that will run the program. On the other hand, the low-level programming language may specify particular physical registers that will store the program variables at any given time in the program. In other words, the high-level programming language may be a register-independent programming language while the low-level programming language may be a register-specific programming language.

In order to translate source code that is written in a register-independent programming language to a register-specific programming language, a compiler may perform register allocation. Register allocation may refer to the process of assigning physical registers to variables and/or temporaries of the program that is being compiled. The variables of the program may correspond to variables that are specified in the source code for the program. The temporaries of the program may refer to temporary variables that are generated by a compiler while compiling the program.

The number of physical registers in a processor is generally limited, and for many types of programs, the number of variables and temporaries may outnumber the number of physical registers available to store such variables and temporaries. In such cases, some of the variables and/or temporaries that are stored in the physical registers may need to be transferred to external memory to accommodate other variables and/or temporaries that also need to use the physical registers.

Transferring variables and/or temporaries that are stored in registers to external memory to accommodate other variables and/or temporaries may be referred to as spilling the registers into memory. Spilling registers may reduce the performance of a program because of memory access latencies associated with transferring the register values to and from memory. Designing register allocators to reduce spilling and produce efficient compiled code with a limited number of physical registers presents a significant challenge to compiler programmers.

SUMMARY

This disclosure describes techniques for allocating registers in a computing system that supports vector physical registers. The techniques for allocating registers may include allocating physical registers to vector virtual registers based on priority information that is indicative of a relative importance of allocating respective vector virtual registers as vectors rather than scalars. A register file may support a limited number of vector physical registers, which may limit the number of vector virtual registers that can be allocated as vectors in the register file at a given time. It may be more important for correct performance and/or better performance of a compiled program to allocate some types of vector virtual registers as vectors rather than others. Using priority information to selectively allocate vector virtual registers as either vectors or scalars may allow those vector virtual registers for which allocation as a vector is relatively more important for the overall performance of the program to be allocated as vectors. In this way, the performance of compiled code may be improved in a computing system that supports vector physical registers.

In one example, this disclosure describes a method that includes allocating, with one or more processors, physical registers to vector virtual registers based on priority information that is indicative of a relative importance of assigning vector physical registers rather than scalar physical registers to respective vector virtual registers.

In another example, this disclosure describes a device that includes one or more processors configured to allocate physical registers to vector virtual registers based on priority information that is indicative of a relative importance of assigning vector physical registers rather than scalar physical registers to respective vector virtual registers.

In another example, this disclosure describes an apparatus that includes means for obtaining priority information that is indicative of a relative importance of assigning vector physical registers rather than scalar physical registers to respective vector virtual registers. The apparatus further includes means for allocating physical registers to vector virtual registers based on the priority information.

In another example, this disclosure a non-transitory computer readable storage medium comprising instructions that upon execution by one or more processors cause the one or more processors to allocate physical registers to vector virtual registers based on priority information that is indicative of a relative importance of assigning vector physical registers rather than scalar physical registers to respective vector virtual registers.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a conceptual diagram illustrating example concepts associated with register allocation and register spilling according to this disclosure.

FIG. 4 is a conceptual diagram illustrating example vector register allocation techniques according to this disclosure.

FIG. 5 is a conceptual diagram illustrating example tradeoffs between allocating a vector virtual register as a vector or as a scalar according to this disclosure.

FIG. 7 is a conceptual diagram illustrating another example case of vector-scalar live interval splitting according to this disclosure.

DETAILED DESCRIPTION

Figure 1:
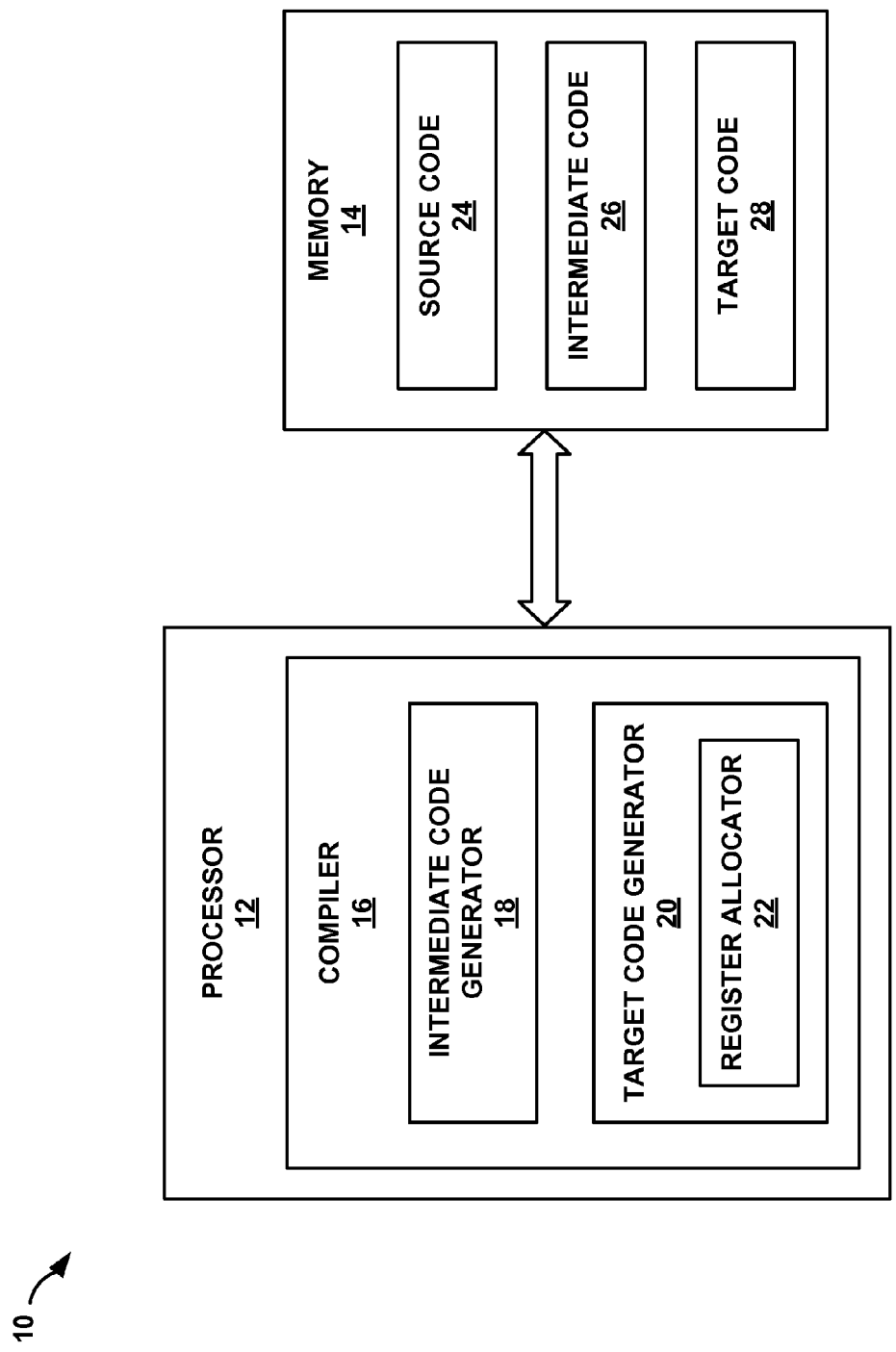
FIG. 1 is a block diagram illustrating an example computing device that implements the register allocation techniques of this disclosure.

This disclosure describes techniques for allocating registers in a computing system that supports vector physical registers. The techniques for allocating registers may include allocating physical registers to vector virtual registers based on priority information that is indicative of a relative importance of allocating respective vector virtual registers as vectors rather than scalars. A register file may support a limited number of vector physical registers, which may limit the number of vector virtual registers that can be allocated as vectors in the register file at a given time. It may be more important for correct performance and/or better performance of a compiled program to allocate some types of vector virtual registers as vectors rather than others. Using priority information to selectively allocate vector virtual registers as either vectors or scalars may allow those vector virtual registers for which allocation as a vector is relatively more important for the overall performance of the program to be allocated as vectors. In this way, the performance of compiled code may be improved in a computing system that supports vector physical registers.

Allocating a vector virtual register as a vector may refer to assigning and/or allocating one or more vector physical registers to a vector virtual register. Similarly, allocating a vector virtual register as a scalar may refer to assigning and/or allocating two or more scalar physical registers to a vector virtual register. As such, the priority information that is indicative of a relative importance of allocating respective vector virtual registers as vectors rather than scalars may be alternatively referred to as priority information that is indicative of a relative importance of assigning vector physical registers rather than scalar physical registers to respective vector virtual registers.

A virtual register may refer to a variable or a temporary of a program that is being compiled. The variables of a program may correspond to the variables that are specified in the source code for the program. The temporaries of a program may refer to temporary variables that are generated by a compiler while compiling the program. A physical register may refer to the actual circuitry in a processor that stores a variable or temporary for a program.

A vector virtual register may refer to a vector variable or a vector temporary of a program that is being compiled. A vector variable and a vector temporary may each refer to a variable that includes multiple elements, components, or values. A scalar virtual register may refer to a scalar variable or a scalar temporary of a program that is being compiled. A scalar variable and a scalar temporary may each refer to a variable that includes a single element, component, or value.

A vector physical register may refer to one or more physical registers that are configured to store multiple values that correspond to the elements of a vector variable, vector temporary, or vector virtual register. The multiple values stored in a single vector physical register may correspond to the elements of a single vector variable, vector temporary, or vector virtual register. A scalar physical register may refer to a physical register that is configured to store a single value that corresponds to a scalar variable, a scalar temporary, or a scalar virtual register. A scalar physical register may also store a single value that corresponds to one of the elements of a vector variable, vector temporary, or vector virtual register.

In some examples, vector physical registers may be allowed to be used as operands for vector operations, and not be allowed to be used as operands for scalar operations. Similarly, in such examples, scalar physical registers may be allowed to be used as operands for scalar operations, and not be allowed to be used as operands for vector operations. The operands for a vector operation or a scalar operation may include the source and destination registers used for their respective operation.

A vector operation may refer to an operation that includes one or more multiple-component (i.e., multiple-element) vectors as operands for the operation. A scalar operation may refer to an operation that does not include multiple-component vectors as operands for the operation. A scalar operation may include single-element component vectors as operands for the operation. In other words, a vector operation may refer to an operation that accesses or modifies multiple components, elements, or values of each of one or more vector physical registers as part of a single operation, while a scalar operation may refer to an operation that accesses or modifies one or more scalar physical registers as part of the operation.

The target code may include vector instructions that specify vector operations, and scalar instructions that specify scalar operations. A vector instruction may specify vector physical registers as operands for a vector operation, and a scalar instruction may specify scalar physical registers for a scalar operation.

In some examples, a vector operation may be converted into a set of multiple scalar operations that produce the same result as the single vector operation. For example, one scalar operation may be performed for each of the corresponding components of the vectors included in the vector operation. In such examples, a vector operation may be specified by a single vector instruction that specifies a single source or destination vector physical register for each operand of the operation. However, the set of equivalent scalar operations may be need to be specified by multiple scalar instructions, which may collectively specify multiple source or destination scalar registers for each operand in the original vector operation. Thus, using vector operations as opposed to scalar operations to perform equivalent functionality may increase the compactness of the compiled code.

Some types of physical register files may include multiple physical registers that are configurable to operate as scalar physical registers or as vector physical registers. Each individual physical register in such a register file may be configured to operate as a scalar physical register. Multiple physical registers in the register file may be grouped together to operate as a single vector physical register where the number of physical registers that are grouped together may determine the number of elements or values capable of being stored by the vector physical register. When multiple physical registers in a physical register file are grouped together to operate as a vector physical register, the multiple physical registers may be configured to allow the multiple elements or values of the vector physical register to be accessed and/or modified as part of a single vector operation.

A physical register file that allows multiple physical registers to be configurable as either scalar physical registers or vector physical registers may, in some examples, allow only certain combinations of physical registers to be grouped together to form vector physical registers, and not allow other combinations of physical registers to be grouped together to form vector physical registers. For example, a physical register file may, in some examples, be organized as a linear, one-dimensional array of physical registers, and the physical register file may only allow adjacent registers in the linear, one-dimensional array of physical registers to be grouped together to operate as vector physical registers. In other words, the example physical register file may not allow non-adjacent registers to be grouped together to operate as vector physical registers.

Allowing only adjacent registers to be grouped together into vector physical registers may allow vector physical registers to be compactly represented by a single one of the physical registers that correspond to the vector physical register. For example, a 4-element vector physical register may be represented by the name for the first physical register in the adjacent set of 4 physical registers that store the 4-element vector. Allowing vector physical registers to be compactly represented in this manner may reduce the size of instructions and/or simply the decoding of instructions.

In some examples, the physical register file may allow only particular amounts or numbers of physical register to be grouped together to operate as vector physical registers. For example, the physical register file may allow only two, four, eight, and/or sixteen physical registers to be grouped together to form a vector physical register.

As discussed above, the techniques of this disclosure may selectively allocate either a vector physical register or a plurality of scalar physical registers to a vector virtual register based on priority information. In physical register files that allow multiple physical registers to be configurable as either scalar physical registers or vector physical registers, allocating a vector physical register to a vector virtual register may correspond to allocating a combination of physical registers that can be combined into a vector physical register to the vector virtual register. On the other hand, allocating a plurality of scalar physical registers to a vector virtual register may correspond to allocating a combination of physical registers that cannot be combined into a vector physical register to the vector virtual register. Whether or not a combination of physical registers may be combined may be specified by one or more of the requirements of the physical register file, the requirements of the compiler, or the requirements of the instruction set architecture (ISA) of the processor.

FIG. 1 is a block diagram illustrating an example computing device 10 that implements the register allocation techniques of this disclosure. Computing device 10 may be any type of computing device including a personal computer, a desktop computer, a laptop computer, a computer workstation, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a video game platform or console, a personal music player, a video player, a display device, a television, a television set-top box, a server, an intermediate network device, a mainframe computer or any other type of computing device. Computing device 10 includes a processor 12 and a memory 14.

Processor 12 may be, for example, a programmable processor, a microprocessor, or other type of processor that is configured to execute a compiler. Memory 14 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium.

As shown in FIG. 1, processor 12 is configured to execute a compiler 16. Compiler 16 may include an intermediate code generator 18 and a target code generator 20. Target code generator 20 may include a register allocator 22. In some examples, the executable program instructions for compiler 16 may be stored in memory 14, and processor 12 may be configured to retrieve the executable program instructions that correspond to compiler 16 from memory 14, and further configured to execute the instructions.

Memory 14 may store source code 24, intermediate code 26, and target code 28. Source code 24, intermediate code 26, and target code 28 may all correspond to equivalent computer programs, but may have instructions that are written in different formats. The different formats of instructions may correspond to different programming languages and/or compiler intermediate code formats.

In some examples, source code 24 may conform to a register-independent programming language that does not specify how the program variables are stored in the physical registers of the underlying processor that will run the program, while target code 28 may conform to a register-specific programming language that specifies particular physical registers which will store the program variables at any given time in the program. In further examples, intermediate code 26 may be register-independent code that does not specify how the program variables are stored in the physical registers of the underlying processor that will run the program.

In additional examples, source code 24 may be high-level programming language that supports vector data types, such as, e.g., the Open Computing Language (OpenCL™) C programming language that is defined according to the OpenCL™ specification. Further details regarding the OpenCL™ API can be found in "The OpenCL Specification," Version: 2.0, Document Revision 19, Khronos OpenCL Working Group, Nov. 14, 2013; "The OpenCL C Specification," Version: 2.0, Document Revision 19, Khronos OpenCL Working Group, Nov. 14, 2013; and "The OpenCL Extension Specification," Version: 2.0, Document Revision 19, Khronos OpenCL Working Group, Nov. 14, 2013. In further examples, target code 28 may be a low-level computing language, such as, e.g., assembly language, object code, and/or machine code.

Compiler 16 may generate target code 28 for a computer program based on source code 24 for the computer program. In other words, compiler 16 may translate source code 24 into target code 28. To generate target code 28, intermediate code generator 18 may generate intermediate code 26 based on source code 24. Source code 24 may include one or more program variables. Intermediate code 26 may include one or more program variables and/or one or more temporaries.

Temporaries may refer to compiler-generated variables. For example, intermediate code generator 18 may generate one or more temporaries (i.e., temporary variables), and include the temporaries in intermediate code 26. The program variables and/or temporaries included in intermediate code 26 may be collectively referred to as virtual registers. The virtual registers may include vector virtual registers and/or scalar virtual registers.

Target code generator 20 may generate target code 28 based on intermediate code 26. To generate target code 28, register allocator 22 may allocate physical registers to virtual registers (e.g., vector virtual registers) that are included in intermediate code 26. Register allocator 22 may use any of the register allocation techniques described in this disclosure to allocate the physical registers to the virtual registers. For example, with respect to vector virtual registers, register allocator 22 may allocate physical registers to vector virtual registers based on priority information that is indicative of a relative importance of assigning vector physical registers rather than scalar physical registers to respective vector virtual registers as described in this disclosure.

Although the example compiler 16 of FIG. 1 is illustrated as including an intermediate code generator 18 that generates intermediate code 26, in other examples, compiler 16 may generate target code 28 directly from source code 24. In such examples, register allocator 22 may allocate physical registers to the variables included in source code 24.

Figure 2:
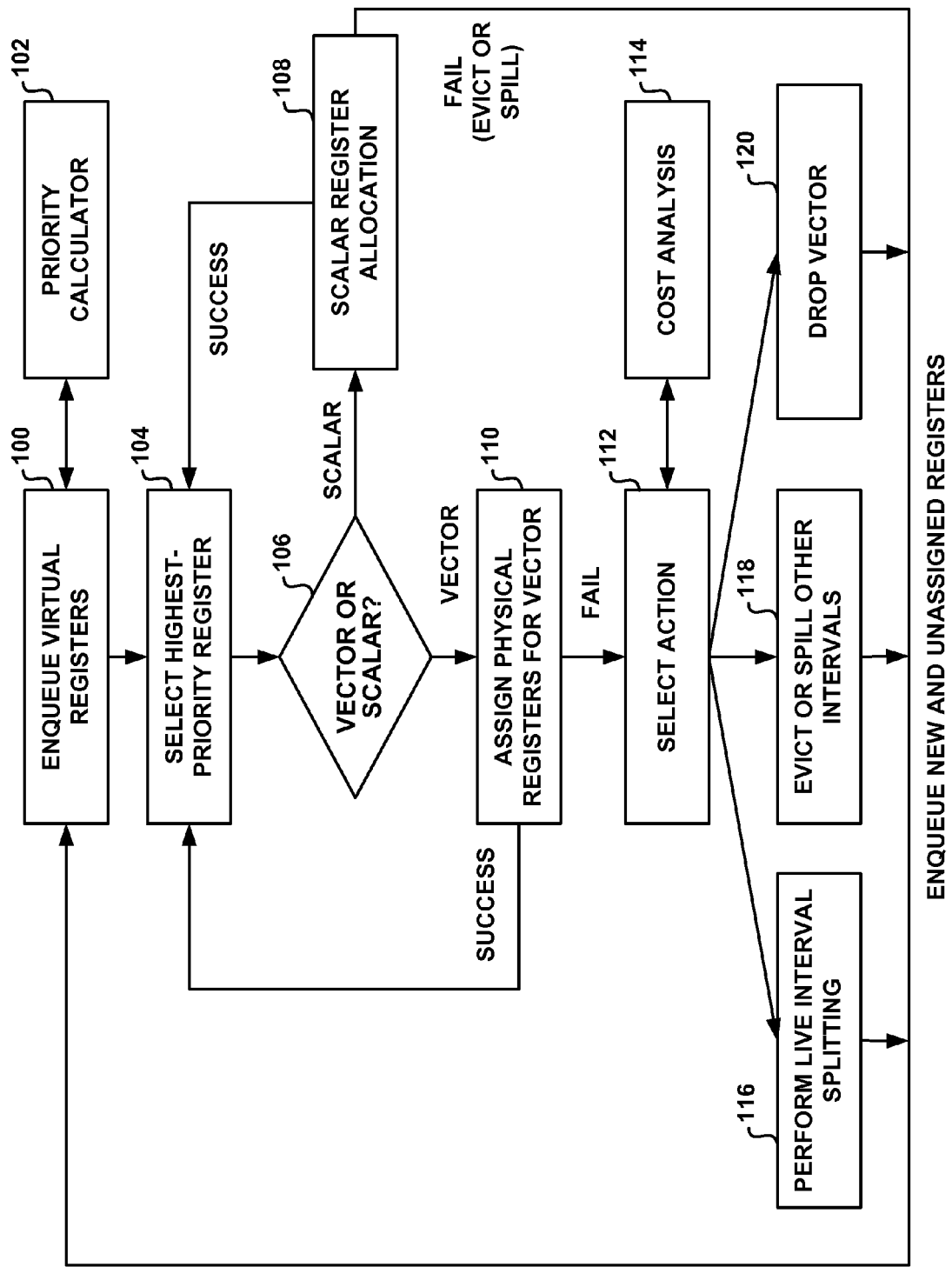
FIG. 2 is a flow diagram illustrating an example register allocation technique according to this disclosure.

FIG. 2 is a flow diagram illustrating an example register allocation technique according to this disclosure. Register allocator 22 enqueues virtual registers in a queue (100). The virtual registers may include vector virtual registers and, in some examples, scalar virtual registers. Each of the virtual registers may correspond to a variable in source code 24 or a temporary in intermediate code 26.

Register allocator 22 assigns a priority value to each of the virtual registers (102). As shown in FIG. 2, register allocator 22 may include a priority calculator (or priority engine) that assigns the priority values to the virtual registers. Each of the priority values may be indicative of a relative importance of assigning one or more vector physical registers rather than scalar physical registers to a vector virtual register. The priority values may be an example of priority information that is indicative of a relative importance of assigning vector physical registers rather than scalar physical registers to respective vector virtual registers. The priority calculator may be used to obtain priority information that is indicative of a relative importance of assigning vector physical registers rather than scalar physical registers to respective vector virtual registers.

Register allocator 22 selects a virtual register that has a highest priority value (104). The virtual register may be selected from the set of virtual registers that are enqueued in the queue. In cases where there are multiple virtual registers with the highest priority value, then one of the virtual registers with the highest priority value may be selected based on any type of selection technique (e.g., random, first register to be enqueued, etc.).

Once selected, the virtual register may be removed from the queue, and physical registers may be allocated to the virtual register. To allocate physical registers to the virtual register, register allocator 22 determines whether the virtual register is a vector virtual register or a scalar virtual register (106). If the virtual register is a scalar virtual register, then register allocator 22 performs scalar register allocation (108). For example, register allocator 22 may assign a scalar physical register to the scalar virtual register. If the scalar register allocation is successful (i.e., a scalar physical register was available to assign to the scalar virtual register), then register allocator 22 returns to process box 104 to select another virtual register with a highest priority from the remaining enqueued virtual registers.

If the assignment is unsuccessful (i.e., failed because no scalar physical register was available to assign to the scalar virtual register), then register allocator 22 may evict or spill other register live intervals into memory in order to assign a physical register to the scalar virtual register. Evicting or spilling other register live intervals may involve causing one or more virtual registers to be stored in memory for part of the live interval of the virtual register. After evicting and/or spilling registers for a case where no scalar physical registers are available for assignment, register allocator 22 may enqueue any new and unassigned virtual registers that were generated as a result of the eviction/spilling (100). A priority calculator may calculate priority values for the newly enqueued virtual registers (102). Register allocator 22 may proceed to select a virtual register with a highest priority from the remaining enqueued virtual registers (104), and allocate physical registers to the selected virtual register.

Returning to decision box 106, if the virtual register is a vector virtual register, then register allocator 22 assigns a vector physical register to the vector virtual register (110). If the assignment is successful, then register allocator 22 returns to process box 104 to select another virtual register with a highest priority from the remaining enqueued virtual registers.

In some examples, an assignment of a vector virtual register may be successful if a vector physical register is available for the entire live interval of the vector virtual register. If one or more vector physical registers are available for part of the live interval of the vector virtual register, but not for the entire live interval of the vector virtual register, then the vector physical registers may be considered to be not available.

If the assignment was unsuccessful (i.e., fail), then register allocator 22 determines or selects an action to perform in response to determining that there are no available vector physical registers for assignment (112). Register allocator 22 may select an action to perform based on the priority values obtained from the priority calculator (102) and/or based on impact analysis information that is indicative of an impact on program performance associated with using one or more of the candidate actions. The example register allocation technique shown in FIG. 2 includes three different candidate actions that may be selected in response to determining that no vector physical registers are available to allocate to the virtual register.

The first candidate action is an action that performs vector-scalar live interval splitting for the virtual register (116). Vector-scalar live interval splitting may be alternatively referred to as register interval splitting for a vector. Vector-scalar live interval splitting may involve splitting the live interval of a vector virtual register into a vector live interval during which one or more vector physical registers are assigned to the vector virtual register and a scalar live interval during which two or more scalar physical registers are assigned to the vector virtual register. The two or more scalar physical registers may, in some cases, be a combination of scalar physical registers that cannot be grouped together to form a vector physical register.

A live interval for a virtual register may refer to the interval of execution between the initial assignment of the virtual register and the last use of the virtual register. A vector live interval may refer to an interval of execution where a vector virtual register is allocated as a vector (i.e., one or more vector physical registers are allocated or assigned to the vector virtual register). A scalar live interval may refer to an interval of execution where a vector virtual register is allocated as a scalar (i.e., two or more scalar physical registers are allocated or assigned to the vector virtual register). In some examples, the two or more scalar physical registers may be a combination of scalar physical registers that cannot be grouped together to form a vector physical register.

The vector live interval and the scalar live interval may, in some examples, be separated by instructions to copy the elements of the vector virtual register between these intervals. For example, the vector-scalar live interval splitting may split the live interval of a vector virtual register into a scalar live interval followed by a vector live interval. During the scalar live interval, the elements of the vector virtual register may be stored in scalar physical registers, which in some examples, may not be able to be grouped together into a single vector physical register. Between the scalar live interval and the vector live interval, register allocator 22 and/or target code generator 20 may insert instructions into the target code that copy the elements of the vector virtual register that are stored in the separate scalar physical registers into a single vector physical register. During the vector live interval, the elements of the vector may be stored in the single vector physical register, and vector operations may be performed with respect to the vector physical register.

As another example, the vector-scalar live interval splitting may split the live interval of a vector virtual register into a vector live interval followed by a scalar live interval. During the vector live interval, the elements of the vector virtual register may be stored in a single vector physical register. Between the vector live interval and the scalar live interval, register allocator 22 and/or target code generator 20 may insert instructions into the target code that copy the elements of the vector virtual register that are stored in the single vector physical register from the vector physical register to multiple scalar physical registers, which in some examples, may not be able to be grouped together into a vector physical register. During the scalar live interval, the elements of the vector virtual register may be stored in scalar physical registers.

As a further example, the vector-scalar live interval splitting may split the live interval of a vector virtual register into a scalar live interval followed by a vector live interval followed by a scalar live interval. In such an example, register allocator 22 and/or target code generator 20 may insert copy instructions into the code similar to the instructions discussed above in each of the previous two examples.

In some examples, each of the virtual registers that are queued in the register queue may have a live interval that is defined for the respective virtual register. In such examples, in order to perform vector-scalar live interval splitting for a vector virtual register that is currently being processed, register allocator 22 may determine one or more vector live intervals and one or more scalar live intervals that collectively span the live interval of the vector virtual register. Register allocator 22 may further generate one or more vector virtual registers that have live intervals that collectively span all or part of the determined vector live intervals, and generate one or more scalar virtual registers that have live intervals that collectively span all or part of the determined scalar live intervals. Register allocator 22 may then enqueue the newly generated vectors into the register queue (100) for further processing. A priority calculator may calculate priority values for the newly enqueued virtual registers (102). Register allocator 22 may proceed to select a virtual register with a highest priority from the remaining enqueued virtual registers (104), and allocate physical registers to the selected virtual register.

The second candidate action is an action that evicts or spills other register live intervals (i.e., live intervals for registers other than the vector virtual register currently being processed) into memory in order to assign a vector physical register to the vector virtual register (118). Evicting or spilling other register live intervals may involve causing one or more virtual registers to be stored in memory for part of the live interval of the virtual register. The one or more virtual registers that are stored in memory may be scalar virtual registers or vector virtual registers. The values corresponding to the virtual register that are stored in the memory may be transferred into physical registers when the values are accessed by the program instructions, and may be transferred to memory for part of the live interval of the virtual register when the values are not accessed by the program instructions.

After evicting and/or spilling registers for a case where no vector physical registers are available for assignment, register allocator 22 may enqueue any new and unassigned virtual registers that were generated as a result of the eviction/spilling (100). A priority calculator may calculate priority values for the newly enqueued virtual registers (102). Register allocator 22 may proceed to select a virtual register with a highest priority from the remaining enqueued virtual registers (104), and allocate physical registers to the selected virtual register.

The third candidate action is an action that drops the vector (e.g., ignores priority for the vector) (120). An action that drops the vector may be an action that assigns a plurality of scalar physical registers to the virtual register. In some examples, the plurality of scalar physical registers may be a combination of scalar physical registers that cannot be grouped together to form a vector physical register. In such examples, the benefits of assigning a vector physical register to the vector virtual register (e.g., compact representation of instructions and/or faster instruction decode) may not be obtained.

In some examples, to drop the vector, register allocator 22 may generate a plurality of scalar virtual registers that correspond to the vector virtual register (120) and enqueue the scalar virtual registers into the register queue (100). For example, register allocator 22 may generate one scalar virtual register for each element of the vector virtual register. Generating and enqueuing scalar virtual registers for the vector virtual register in this manner may cause the vector virtual register to be allocated as a scalar.

In some examples, steps 104, 106, 18 and 110 of FIG. 2 may correspond to priority allocating physical registers to virtual registers that are enqueued in the register queue. To priority allocate physical registers to the virtual registers, register allocator 22 may allocate the physical registers to the virtual registers in an order that is determined based on the priorities generated by the priority engine (i.e., priority calculator). To allocate physical registers to each of the virtual registers, register allocator 22 may determine whether the virtual register is a vector virtual register or a virtual register. If the virtual register is a scalar virtual register, then register allocator 22 may allocate physical registers to the virtual register using scalar register allocation techniques, and proceed to allocate physical registers to the next virtual register.

If the virtual register is a vector virtual register, then register allocator 22 may determine whether any vector physical registers are available to allocate to the virtual register. If any vector physical registers are available to allocate to the virtual register, then register allocator 22 may assign one or more of the available vector physical registers to the virtual register, and proceed to allocate physical registers to the next virtual register. In some examples, if one or more vector physical registers are available for part of the live interval of the virtual register, but not for the entire live interval of the virtual register, then the vector physical registers may be considered to be not available.

If no vector physical registers are available to allocate to the virtual register, then register allocator 22 may select an appropriate action to perform based on the priority values obtained from the priority engine and/or based on impact analysis information that is indicative of an impact on program performance associated with using one or more of the candidate actions. The example register allocation technique shown in FIG. 2 includes three different actions that may be selected in response to determining that no vector physical registers are available to allocate to the virtual register.

For example, register allocator 22 may select one of the actions depicted in process boxes 116, 118, 120 based on the priority value of the virtual register for which the action is being selected. In further examples, register allocator 22 may perform an impact analysis that determines an impact on program performance associated with using one or more of the candidate actions, and select one of the actions depicted in process boxes 116, 118, 120 based on the impact analysis. In additional examples, register allocator 22 may select the action based on both the priority value and the impact analysis.

While performing the actions depicted in one or more of process boxes 116, 118, 120, register allocator 22 may, in some examples, generate one or more new virtual registers. Register allocator 22 may return to process box 100 to enqueue the new virtual registers, and allocate physical registers to the new virtual registers. Register allocator 22 may assign priority values to the newly enqueued virtual registers, and assign physical registers to the newly enqueued virtual registers based on the priority values. Register allocator 22 may repeat the process shown in FIG. 2 until physical registers have been assigned to all of the virtual registers.

As discussed above, register allocator 22 may prioritize candidate virtual registers. In some cases, for virtual registers (e.g., vector virtual registers) associated with load instructions and/or store instructions, register allocator 22 may determine a relative profitability of performing the load/store instruction as a vector load/store instruction or as multiple scalar load/store instruction. Register allocator 22 may determine whether to allocate one or more vector virtual registers associated with the load and/or store instructions as vectors or as scalars based on the determined relative profitability.

In some examples, to determine the relative profitability of performing the load/store instruction as a vector load/store instruction or as multiple scalar load/store instructions, register allocator 22 may determine whether the program is a memory intensive program. For example, register allocator 22 may determine a percentage of time that is spent by a program performing load instructions and/or store instructions. As another example, register allocator 22 may determine a percentage of instructions in the program that correspond to load instructions and/or store instructions. If one or both of these percentages is greater than a threshold, then register allocator 22 may determine that the program is memory intensive. In response to determining that a program is memory intensive, register allocator 22 may assign higher priority values to vector virtual registers associated with load instructions and/or store instructions in the program compared to the priority values that would be assigned if the program were not as memory intensive.

In further examples, to determine the relative profitability of performing the load/store instruction as a vector load/store instruction or as multiple scalar load/store instructions, register allocator 22 may determine whether the particular load or store instruction at issue is inside of a hot loop. A hot loop may refer to a loop that is executed a relatively large number of times. In response to determining that the particular load or store instruction at issue is inside of a hot loop, register allocator 22 may assign a higher priority value to one or more vector virtual registers that correspond to the load or store instruction at issue.

With respect to selecting an action to take when no vector physical register is available to allocate to a particular vector virtual register (e.g., boxes 112), register allocator 22 may, in some examples, determine whether the vector virtual register is a high priority vector virtual register. If the vector virtual register is a high priority vector virtual register, then register allocator 22 may perform vector-scalar live interval splitting to reduce the vector lifetime of the vector virtual register (116). On the other hand, if the vector virtual register is a low priority vector virtual register, then register allocator 22 may drop or ignore the vector virtual register (120). In this way, priority information may be used to select an action to perform when no vector physical register is available to allocate to a particular vector virtual register.

In some cases, register allocator 22 may assign priority values to vector virtual registers with decreasing priority in the following order: (1) vector virtual registers that need to be assigned to vector physical registers (e.g., multiple adjacent registers) for correct operation of the program; (2) vector virtual registers that may optionally be assigned to vector physical registers to facilitate wider memory loads; and (3) vector virtual registers that may optionally be assigned to vector physical registers to help, for example, improve overall execution time, power consumption, and/or program size.

Examples of vector virtual registers that may need to be assigned to vector physical registers may include vector virtual registers that are associated with operations that provide a result based on multiple elements of a vector, and function calls that take vector arguments and/or return vectors. Examples of vector virtual registers that may optionally be assigned to vector physical registers to facilitate wider memory loads include vector virtual registers that are associated with load instructions accessing consecutive memory locations in a memory intensive program.

According to some aspects of this disclosure, register allocator 22 may be configured to allocate physical registers to vector virtual registers based on priority information that is indicative of a relative importance of assigning vector physical registers rather than scalar physical registers to respective vector virtual registers (e.g., FIG. 2). Using priority information to selectively allocate vector virtual registers as either vectors or scalars may allow those vector virtual registers for which allocation as a vector is relatively more important for the overall performance of the program to be allocated as vectors. In this way, the performance of compiled code may be improved in a computing system that supports vector physical registers.

In some examples, for one or more of the vector virtual registers, register allocator 22 may determine whether to assign one or more vector physical registers or a plurality of scalar physical registers to the respective vector virtual register based on the priority information. In some cases, determining whether to assign one or more vector physical registers or a plurality of scalar physical registers to the respective vector virtual register may involve determining whether to assign one or more vector physical registers or a plurality of scalar physical registers to a vector virtual register at a vector use point in the live interval of the vector virtual register.

A vector use point may correspond to a portion of a live interval for a vector virtual register where a vector operation may be performed with respect to the vector virtual register if a vector physical register is assigned to the vector virtual register at that point. In response to determining to assign one or more vector physical registers to a vector virtual register at a vector use point, register allocator 22 may, in some examples, compile a source code program instruction that corresponds to the vector use point into a vector operation. In response to determining to assign a plurality of scalar physical registers to a vector virtual register at a vector use point, register allocator 22 may compile a source code program instruction that corresponds to the vector use point into a plurality of scalar operations.

In further examples, for each of one or more vector virtual registers, register allocator 22 may determine whether to perform vector-scalar live interval splitting for the respective vector virtual register based on the priority information (112, 116). Vector-scalar live interval splitting for a respective vector virtual register may include splitting the live interval for the respective vector virtual register into a vector live interval during which one or more vector physical registers are assigned to the respective vector virtual register and a scalar live interval during which two or more scalar physical registers are assigned to the respective vector virtual register. In such examples, register allocator 22 may, in some examples, determine whether to perform vector-scalar live interval splitting for the respective vector virtual register based on the priority information and/or based on impact analysis information that is indicative of an impact on program performance associated with performing and/or not performing vector-scalar live interval splitting.

In additional examples, for each of one or more vector virtual registers, register allocator 22 may determine whether to spill other register live intervals into memory in order to assign a vector physical register to the respective vector virtual register (112, 118). In such examples, register allocator 22 may, in some examples, determine whether to spill other register live intervals into memory in order to assign a vector physical register to the respective vector virtual register and/or based on impact analysis information that is indicative of an impact on program performance associated with spilling and/or not spilling other register live intervals. The other register live intervals may correspond to register live intervals for one or more registers other than the vector virtual register to which physical registers are being assigned.

In yet further examples, for each of one or more vector virtual registers, register allocator 22 may determine whether to allocate scalar physical registers to a vector virtual register based on the priority information (112, 116). In such examples, register allocator 22 may, in some examples, determine whether to allocate scalar physical registers to a vector virtual register based on the priority information and/or based on impact analysis information that is indicative of an impact on program performance associated with allocating and/or not allocating scalar physical registers to the vector virtual register.

In some examples, register allocator 22 may allocate the physical registers to vector virtual registers in an order that is determined based on the priority information (104, 106, 110). For example, register allocator 22 may process each of the vector virtual registers in an order that is determined based on the priority information, and while processing each of the vector virtual registers, assign physical registers to the respective vector virtual register. This may allow higher priority vector virtual registers to be assigned to available vector physical registers before lower priority vector virtual registers.

In additional examples, register allocator 22 may, in response to determining that there are no vector physical registers available to which a vector virtual register can be assigned, select an action from a set of candidate actions based on the priority information (112), and perform the selected action (116, 118, 120). In such examples, the set of candidate actions may, in some examples, include an action that performs vector-scalar live interval splitting for the vector virtual register (116), an action that spills other register live intervals into memory in order to assign a vector physical register to the vector virtual register (118), and an action that assigns a plurality of scalar physical registers to the vector virtual register (120). In further examples, register allocator 22 may select the action based on the priority information and/or based on impact analysis information that is indicative of an impact on program performance associated with using one or more of the candidate actions.

In some examples, in order to select the action from the candidate set of actions, register allocator 22 may determine whether vector physical registers rather than scalar physical registers need to be assigned to a vector virtual register for correct operation of a program that corresponds to the vector virtual registers, and select one of the action that performs vector-scalar live interval splitting (116) and the action that spills other register live intervals (118) as the selected action to perform in response to determining that vector physical registers rather than scalar physical registers need to be assigned to the vector virtual register for correct operation of the program.

In response to determining that vector physical registers rather than scalar physical registers do not need to be assigned to the vector virtual register for correct operation of the program, register allocator 22 may determine whether a priority value associated with the vector virtual register is greater than or equal to a threshold. In response to determining that the priority value associated with the vector virtual register is greater than or equal to the threshold, register allocator 22 may select one of the action that performs vector-scalar live interval splitting (116) and the action that spills other register live intervals as the selected action (118). In response to determining that the priority value associated with the vector virtual register is not greater than or equal to the threshold, register allocator 22 may select the action that assigns a plurality of scalar physical registers to the vector virtual register (120). In some examples, the plurality of scalar physical registers may be a combination of scalar physical registers that cannot be grouped together to form a vector physical register.

In some examples, to select one of the action that performs vector-scalar live interval splitting (116) and the action that spills other register live intervals (118), register allocator 22 may determine whether it is possible to perform vector-scalar live interval splitting for the vector virtual register. In response to determining that it is possible to perform vector-scalar live interval splitting for the vector virtual register, register allocator 22 may select the action that performs vector-scalar live interval splitting as the selected action (116). In response to determining that it is not possible to perform vector-scalar live interval splitting for the vector virtual register, register allocator 22 may select the action that spills other register live intervals as the selected action (118).

In further examples, to select one of the action that performs vector-scalar live interval splitting (116) and the action that spills other register live intervals (118), register allocator 22 may determine one or more impacts on program performance associated with performing the action that performs vector-scalar live interval splitting and the action that spills other register live intervals. In such examples, register allocator 22 may select the one of the action that performs vector-scalar live interval splitting (116) and the action that spills other register live intervals (118) based on the determined impacts on program performance.

In some examples, the priority information used to allocate physical registers to vector virtual registers may include a plurality of priority values. Each of the priority values may be indicative of a relative importance of assigning one or more vector physical registers rather than scalar physical registers to a vector virtual register. In this disclosure, it is assumed that higher priority values indicate a greater importance of assigning one or more vector physical registers rather than scalar physical registers to a vector virtual register. However, in other examples, lower priority values may indicate a greater importance of assigning one or more vector physical registers rather than scalar physical registers to a vector virtual register.

In examples where the priority information includes priority values, register allocator 22 may, in some examples, determine the priority values based on one or more of information indicative of whether vector physical registers rather than scalar physical registers need to be assigned to respective vector virtual registers for correct operation of a program that corresponds to the vector virtual registers; information indicative of memory access characteristics of a program that corresponds to the vector virtual registers; information indicative of a percentage of time spent by a program that corresponds to the vector virtual registers performing memory access instructions; information indicative of whether respective vector virtual registers are associated with memory access instructions; information indicative of whether respective vector virtual registers are associated with memory access instructions that are included in a loop of a program that corresponds to the vector virtual registers; information indicative of a frequency in which a loop that includes memory access instructions corresponding to respective vector virtual registers is executed, information indicative of a percentage of time spent by a program that corresponds to the vector virtual registers, and information indicative of a improvements in metrics such as, e.g., power, program size that corresponds to the vector virtual registers.

In some examples, register allocator 22 may determine whether respective vector virtual registers need to be assigned to vector physical registers rather than scalar physical registers for correct operation of the program based on the information indicative of whether vector physical registers rather than scalar physical registers need to be assigned to respective vector virtual registers for correct operation of a program that corresponds to the vector virtual registers. In such examples, register allocator 22 may assign higher priority values to vector virtual registers that need to be assigned to vector physical registers rather than scalar physical registers for correct operation of the program and lower priority values to vector virtual registers that do not need to be assigned to vector physical registers rather than scalar physical registers for correct operation of the program.

For example, register allocator 22 may assign a first set of one or more priority values to vector virtual registers that need to be assigned to vector physical registers rather than scalar physical registers for correct operation of the program, and a second set of one or more priority values to vector virtual registers that do not need to be assigned to vector physical registers rather than scalar physical registers for correct operation of the program. In such examples, each of the priority values in the first set of priority values may be greater than each of the priority values in the second set of priority values.

In further examples, the information indicative of memory access characteristics of a program that corresponds to the vector virtual registers may include information indicative of a percentage of time spent by the program performing memory access instructions. In such examples, register allocator 22 may assign higher priority values to vector virtual registers that are associated with memory access instructions of programs that spend relatively high percentages of time performing memory access instructions, and assign lower priority values to vector virtual registers that are associated with memory access instructions of programs that spend relatively low percentages of time performing memory access instructions. In some cases, the memory access instructions may be load instructions and/or store instructions.

For example, register allocator 22 may compare the percentage of time spent by a program performing memory access instructions to a threshold. If the percentage of time spent by the program performing memory access instructions is greater than the threshold, then register allocator 22 may assign a first set of one or more priority values to vector virtual registers that are associated with memory access instructions of the program. If the percentage of time spent by the program performing memory access instructions is not greater than the threshold, then register allocator 22 may assign a second set of one or more priority values to vector virtual registers that are associated with memory access instructions of the program. In such examples, each of the priority values in the first set of priority values may be greater than each of the priority values in the second set of priority values.

In further examples, register allocator 22 may assign higher priority values to vector virtual registers that are associated with memory access instructions of a program, and assign lower priority values to vector virtual registers that are not associated with memory access instructions of the program. The memory access instructions may, in some examples, correspond to load instructions and/or store instructions. For example, register allocator 22 may assign a first set of one or more priority values to vector virtual registers that are associated with memory access instructions of a program, and a second set of one or more priority values to vector virtual registers that are not associated with memory access instructions of a program. Each of the priority values in the first set of priority values may be greater than each of the priority values in the second set of priority values.

In additional examples, register allocator 22 may assign higher priority values to vector virtual registers that are associated with memory access instructions which are included in a loop of a program, and assign lower priority values to vector virtual registers that are associated with memory access instructions which are not included in a loop of a program. The memory access instructions may, in some examples, correspond to load instructions and/or store instructions. For example, register allocator 22 may assign a first set of one or more priority values to vector virtual registers that are associated with memory access instructions which are included in a loop of a program, and a second set of one or more priority values to vector virtual registers that are associated with memory access instructions which are not included in a loop of a program. Each of the priority values in the first set of priority values may be greater than each of the priority values in the second set of priority values.

In further examples, register allocator 22 may assign higher priority values to vector virtual registers that are associated with memory access instructions which are included in a frequently-executed loop of a program, and assign lower priority values to vector virtual registers that are associated with memory access instructions which are included in a non-frequently-executed loop of the program. The memory access instructions may, in some examples, correspond to load instructions and/or store instructions. For example, register allocator 22 may assign a first set of one or more priority values to vector virtual registers that are associated with memory access instructions which are included in a frequently-executed loop of a program, and a second set of one or more priority values to vector virtual registers that are associated with memory access instructions which are included in a non-frequently-executed loop of the program. Each of the priority values in the first set of priority values may be greater than each of the priority values in the second set of priority values.

As another example, register allocator 22 may assign a priority value to a vector virtual register that is associated with a memory access instruction which is included in a loop of a program based on a monotonically increasing function that specifies a priority value as a monotonically increasing function of the frequency of execution of a loop that includes the memory access instruction. In other words, all else being equal, as the frequency of execution of the loop increases, the priority value assigned by register allocator 22 may also increase.

In further examples, register allocator 22 may determine whether a vector virtual register needs to be assigned to vector physical registers rather than scalar physical registers for correct operation of the program. If the vector virtual register needs to be assigned to vector physical registers rather than scalar physical registers for correct operation of the program, then register allocator 22 may assign a priority value from a first set of one or more priority values to vector virtual register. If the vector virtual register does not need to be assigned to vector physical registers rather than scalar physical registers for correct operation of the program, then register allocator 22 may a assign a priority value from either a second set of priority values or a third set of priority values. The priority values in the first set of priority values may be greater than the priority values in the second set of priority values, and the priority values in the second set of priority values may be greater than the priority values in the third set of priority values.

In some examples, in cases where the vector virtual register does not need to be assigned to vector physical registers rather than scalar physical registers for correct operation of the program, then register allocator 22 may determine whether to use priority values from the second or third sets of priority values based on whether the vector virtual register corresponds to an operand that is part of a memory access operation (e.g., a memory read operation, a memory write operation, a load operation, a store operation, etc.). If the vector virtual register corresponds to an operand that is part of a memory access operation, then register allocator 22 may assign a priority value from the second set of priority values to the vector virtual register. Otherwise, if the vector virtual register corresponds to an operand that is not part of a memory access operation, then register allocator 22 may assign a priority value from the third set of priority values to the vector virtual register.

In examples where register allocator 22 uses three sets of priority values, when register allocator 22 determines that priority values from the second set of priority values are to be assigned to a vector virtual register, register allocator 22 may, in some examples, determine the priority value from the second set of priority values to be assigned to the vector virtual register based on an impact analysis associated with assigning vector physical registers rather than scalar physical registers to the vector virtual register.

The impact analysis may analyze the impact that assigning vector physical registers rather than scalar physical registers to a vector virtual register has on one or more parameters (e.g., estimated parameters). In some examples, the parameters may include a program performance parameter such that the impact analysis analyzes and/or produces data indicative of the impact that assigning vector physical registers rather than scalar physical registers to a vector virtual register has on program performance or estimated program performance. For example, register allocator 22 may determine the priority value to assign to the vector virtual register based on data indicative of a performance (e.g., an estimated performance) of the program if vector physical registers were assigned to the vector virtual register relative to a performance (e.g., an estimated performance) of the program if scalar physical registers were assigned to the vector virtual register.

In additional examples, the parameters may include a power consumption parameter such that the impact analysis analyzes and/or produces data indicative of the impact that assigning vector physical registers rather than scalar physical registers to a vector virtual register has on power consumption or estimated power consumption associated with execution of the program. For example, register allocator 22 may determine the priority value to assign to the vector virtual register based on data indicative of power consumed (e.g., estimated power consumed) by the program if vector physical registers were assigned to the vector virtual register relative to power consumed (e.g., estimated power consumed) by the program if scalar physical registers were assigned to the vector virtual register.

FIG. 3 is a conceptual diagram illustrating example concepts associated with register allocation and register spilling according to this disclosure. The left-hand side and right-hand of FIG. 3 illustrates two different techniques for allocating physical registers to two virtual registers (X and Y).

The left-hand side illustrates a two physical register solution (R0 and R1) that allocates the R0 physical register to the X virtual register, and the R1 physical register to the Y virtual register. The instructions beginning with the X and Y virtual registers represent assignment statements that assign values to the X and Y virtual registers, respectively. The instructions beginning with ellipses represent assignment statements that assign the values of the X and Y virtual registers, respectively, to other virtual registers.

The right-hand side illustrates a single physical register solution (R0) that allocates the R0 physical register to the X and Y virtual registers during different time periods. The first instruction beginning with X represents an assignment statement that assigns a value to the X virtual register, which is currently assigned to the R0 physical register. After assigning a value to the X virtual register, the spill instruction represents that the X virtual register is spilled into memory to free up the R0 register for the assignment of another virtual register. After the spill instruction, the R0 physical register is reassigned to the Y virtual register, and the next instruction assigns a value to the Y virtual register. The next instruction that begins with the ellipses represents an assignment statement that assigns the value of the Y virtual register to another virtual register.

After assigning the value of the Y virtual register to another virtual register, the R0 physical register is reassigned to the X virtual register, and the next instruction loads the value of the X virtual register that was spilled into memory into the R0 physical register. The next instruction that begins with the ellipses represents an assignment statement that assigns the value of the X virtual register to another virtual register.

The two physical register solution on the left-hand side of FIG. 3 uses more physical registers than the one physical register solution on the right-hand side, but does not need to perform register spills. The one physical register solution on the right-hand side of FIG. 3 uses less physical registers than the two physical register solution on the left-hand side, but needs to perform a register spill. Register spills may reduce the performance of the resulting compiled code because memory accesses are generally much slower than register accesses. One goal of register allocation may be, in some examples, to minimize the number of physical registers used while achieving minimal spills.

The example vector register allocation techniques shown in FIGS. 4-7 may use a physical register file that allows physical registers to be configurable as either scalar physical registers or vector physical registers. More specifically, the register file may be organized as a linear, one-dimensional array of physical registers that allows adjacent registers in the linear, one-dimensional array of physical registers to be grouped together to operate as vector physical registers, and does not allow non-adjacent registers to be grouped together to operate as vector physical registers.

In the example physical register file used for the example vector register allocation techniques shown in FIGS. 4-7, the vectors in the linear, one-dimensional array may be labeled in the following order: x0.x, x0.y, x0.z, x0.w, x1.x, x0.y y, x1.z, x1.w, x2.x, etc. An example of adjacent physical registers includes x1.x, x1.y, x1.z, and x1.w. Another example of adjacent physical registers includes x0.w and x1.x. An example of non-adjacent physical registers includes x0.y and x1.y.

FIG. 4 is a conceptual diagram illustrating example vector register allocation techniques according to this disclosure. The left-hand side of FIG. 4 illustrates source code. The right-hand side represents compiled code (i.e., target code) for part of the source code.

In some examples, the source code may correspond to a shader program that is configured to execute on a graphics processing unit (GPU). In further examples, the source code may correspond to a general-purpose computing kernel that is configured to execute on a general-purpose compute device, such as, e.g., a GPU, a multi-core central processing unit (CPU), a digital signal processor (DSP), a Cell Broadband Engine (Cell/B.E.) processor, etc. In further examples, the source code may correspond to an OpenCL™ kernel that conforms to the OpenCL™ C programming language.

The first line of the source code is a kernel declaration statement that specifies the name of the kernel (i.e., "foo"), and the parameters for the kernel. The first parameter is an input parameter that specifies a read-only one-dimensional image. The second parameter is an output vector parameter that contains two elements, each of which is a floating point number.

The next line declares a four element floating point vector (i.e., "color") and reads an image into the four element floating point vector. The read_image instruction is translated to an img_read instruction (i.e., image read instruction) as indicated on the right-hand side. The img_read instruction may read four values from memory, and store the four values into four adjacent physical registers (e.g., consecutive registers) in a physical register file (i.e., r1.x, r1.y, r1.z, r1.w). The four adjacent registers in the physical register file may define a vector physical register. Adjacent physical registers are indicated in FIGS. 4-7 with physical registers in parentheses.

The vector virtual register associated with a read_image instruction may be an example of a vector virtual register that needs to be assigned to a vector physical register (e.g., adjacent registers in a register file) rather than scalar physical registers (e.g., non-adjacent registers in a register file) for correct operation of the compiled program. For example, the corresponding img_read instruction may not operate correctly if the vector elements are not stored as a vector (i.e., if the elements are stored in non-adjacent registers). As such, a priority engine that assigns priority values to the vector virtual register associated with the read_image instruction may assign a relatively high priority value to the vector virtual register to ensure that the register allocated as a vector rather than as a scalar.

The next instruction after the read_image instruction is an immediate addition instruction that adds an immediate value of two to the "x" virtual register, and stores the result in the "t" virtual register. The immediate add instruction is translated into an add instruction, the "x" virtual register is assigned to the r0.x physical register, and the "t" virtual register is assigned to the r1.x physical register.

A "For loop" occurs after the immediate addition instruction. Inside the "For loop" is an assignment instruction that assigns respective values to a two-element floating point vector (i.e., results). The assignment instruction, in this example, is translated to a store instruction as indicated on the right-hand side. The store instruction may store one or more values into a memory address indicated by the first argument of the instruction (e.g., mem[r0.x]). When the store instruction stores more than one value, the instruction may be referred to as a vector store instruction. When the instruction stores a single value, the instruction may be referred to as a scalar store instruction.

In this example, the store instruction corresponds to a vector store instruction that stores the values included in two adjacent physical registers (e.g., consecutive registers) in the physical register file (i.e., r1.w, r2.x) to two adjacent memory addresses. The two adjacent registers in the physical register file may form a vector physical register.

The vector virtual register associated with the assignment instruction may be an example of a vector virtual register that does not need to be assigned to vector physical registers (e.g., adjacent registers in a register file) for correct operation of the program, but may be optionally assigned to a vector physical register when such a register is available. Although FIG. 4 illustrates an example where the "results" assignment statement is translated into a vector store operation, and the vector virtual register associated with the "results" assignment statement is assigned to a vector physical register (i.e., r1.w, r2.x), in other examples, the "results" assignment statement may be translated into multiple scalar store operations, and the elements of the "results" vector may be assigned to multiple scalar physical registers (e.g., non-adjacent physical registers) as discussed below with respect to FIG. 5.

FIG. 5 is a conceptual diagram illustrating example tradeoffs between allocating a vector virtual register as a vector or as a scalar according to this disclosure. The left-hand side of FIG. 5 corresponds to an abbreviated version of the right-hand side of FIG. 4. On the left-hand side of FIG. 5, the read_image instruction and the "results" assignment instruction of FIG. 4 have been translated into vector operations. On the right-hand side of FIG. 5, the read_image instruction of FIG. 4 has been translated into a vector operation, and the "results" assignment instruction has been translated into two different scalar store operations instead of a single vector store operation.

As discussed above, the read_image instruction may need to be translated into a vector operation for correct operation of the instruction. Consequently, the destination vector virtual register for the read_image instruction may need to be assigned to a vector physical register for correct operation of the instruction. Hence, both sides of FIG. 5 may assign the destination virtual register for the read_image instruction to a vector physical register (i.e., adjacent physical registers) and use the img_read vector operation.

On other hand, the "results" assignment instruction does not need to be translated into a vector operation. Consequently, the source vector virtual register for the "results" assignment instruction may not need to be assigned to a vector physical register for correct operation of the instruction. Therefore, the left-hand side of FIG. 5 illustrates the case where the "results" assignment instruction is translated into a vector store operation, and the vector virtual register is assigned to a vector physical register. The right-hand side of FIG. 5 illustrates the case where the "results" assignment instruction is translated into a scalar store operation, and the vector virtual register is assigned to multiple scalar physical registers. Note that the scalar physical registers in this example are not adjacent to each other, and therefore form a combination of scalar physical registers that cannot be combined into a vector physical register.

The compiled code on the left-hand side results in wider stores while the compiled code on the right-hand side results in fewer registers. The register allocation techniques of this disclosure may, in some examples, be able to balance these priorities.

Figure 6:
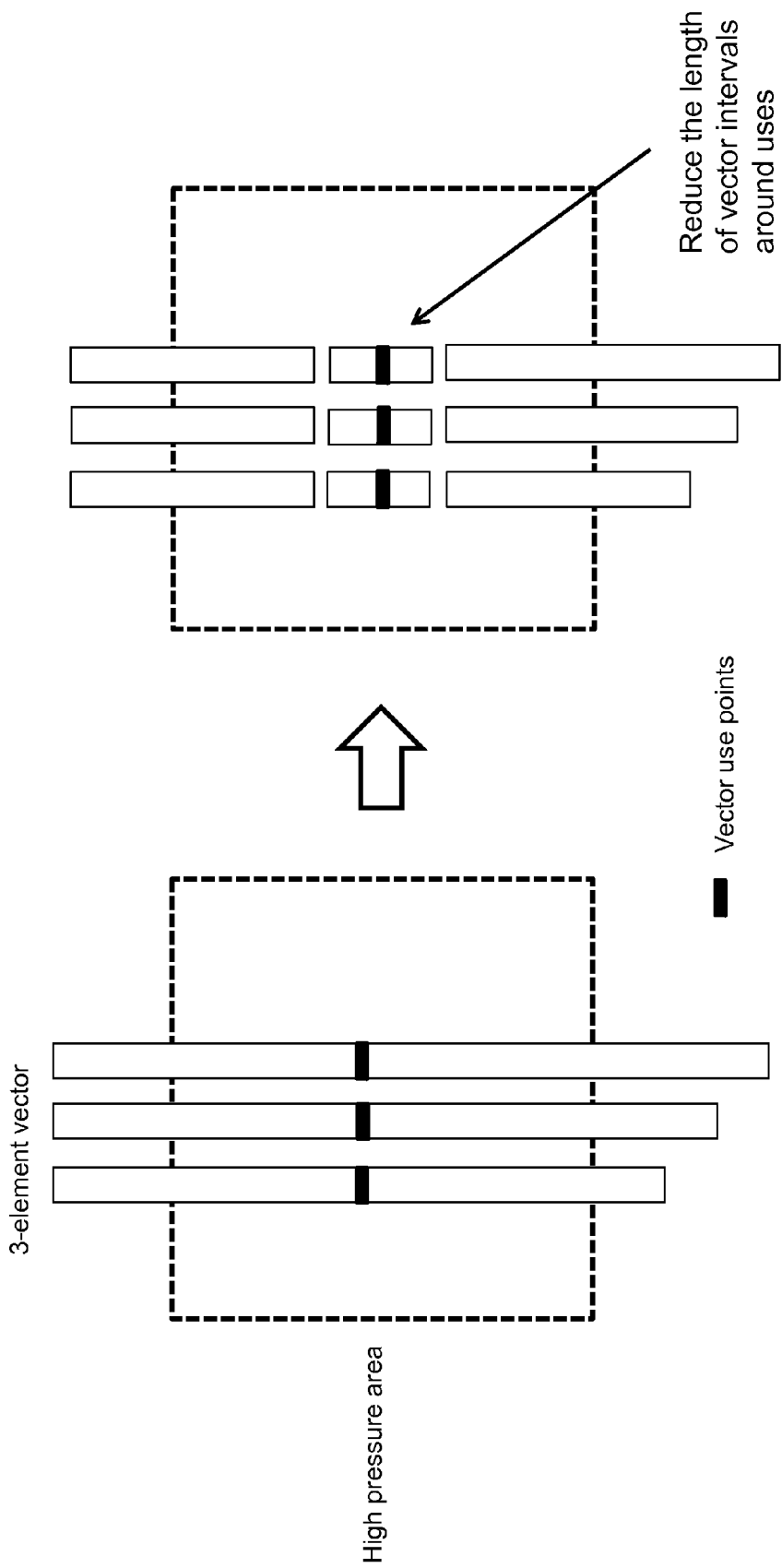
FIG. 6 is a conceptual diagram illustrating an example case of vector-scalar live interval splitting according to this disclosure.

FIG. 6 is a conceptual diagram illustrating an example case of vector-scalar live interval splitting according to this disclosure. The left-hand side of FIG. 6 illustrates a high pressure portion of the code. A high pressure portion of the code may refer to a portion of code where there are fewer physical registers available than what is needed to avoid register spills.

As illustrated in FIG. 6, in the high pressure area or the program, there are three different vector virtual registers that have live intervals which span the high pressure area. The live intervals of the vector virtual registers may include vector use points. A vector use point may correspond to one or more instructions in a program where it may be required and/or beneficial to perform the instruction as a vector operation and to store the corresponding vector virtual registers as vectors (i.e., store the vector virtual registers in vector physical registers (e.g., adjacent physical registers)). In other words, a vector use point may correspond to a portion of a live interval for a vector virtual register where a vector operation may be performed with respect to the vector virtual register if a vector physical register is assigned to the vector virtual register at that point. At other points during the live intervals, it may not be required and/or may not be as beneficial to store the vector virtual registers as vectors. At such points, the elements of the vector virtual registers may be stored in scalar physical registers (e.g., non-adjacent physical registers).

Therefore, as shown on the right-hand side of FIG. 6, the live interval for each of the vector virtual registers may be split into a vector live interval during which one or more vector physical registers are assigned to the respective vector virtual register and a scalar live interval during which multiple scalar physical registers are assigned to the respective vector virtual register. The vector live intervals may correspond to the portions of the live intervals that include the vector use points and the scalar live intervals may correspond to the portions of the live intervals that do not include the vector use points.

The splitting technique described above may be referred to as vector-scalar live interval splitting. As shown on the right-hand side of FIG. 6, vector-scalar live interval splitting may reduce the length of the vector intervals (e.g., vector live intervals) around the vector use points. Reducing the length of the vector intervals may reduce the amount of time that vector physical registers (e.g., adjacent physical registers) need to be allocated to the vector virtual registers, which may increase the amount of time that scalar physical registers (e.g., non-adjacent physical registers) can be allocated to the vector virtual registers. Increasing the amount of time that scalar physical registers may be allocated to vector virtual registers may give greater flexibility to a register allocator, which may improve the performance of the compiled code (e.g., reduce the number of physical registers used and/or reduce the number of register spills).

In some examples, register allocator 22 may determine if a register spill is likely to occur, and split the live interval of a vector register into a vector live interval and a scalar live interval in response to determining that a register spill is likely to occur. In response to determining that a register spill is not likely to occur, register allocator 22 may, in some example, keep the vector virtual register allocated as a vector for the entire live interval of the vector virtual register.

FIG. 7 is a conceptual diagram illustrating another example case of vector-scalar live interval splitting according to this disclosure. The left-hand side of FIG. 7 includes an img_read instruction that performs a vector load operation. The vector load operation loads adjacent registers r1.x, r1.y, r1.z, r1.w with values corresponding to the elements of a four-element vector.

After the img_read instruction is a store instruction that performs a vector store operation for a two-element vector. The two-element vector used for the store operation is located in adjacent registers r2.x and r2.y.

The vector store operation on the left-hand side of FIG. 7 uses adjacent physical registers (i.e., a vector physical register) to store the operands for the two-element vector. As such, the store vector store operation may correspond to a vector use point as discussed above with respect to FIG. 6.

The live interval for the vector virtual register that is stored by the vector store operation may extend from the point in time where the vector virtual register is first assigned (which may be much earlier in the code) to the store operation shown in FIG. 7. In some examples, the benefits of keeping the vector virtual register allocated as a vector at points other than the vector use point may be relatively small compared to the improved register allocation that may be achieved by splitting up the live interval of the vector virtual register. Therefore, the right-hand side of FIG. 7 depicts a case where the vector virtual register that is stored by the store instruction is assigned to non-adjacent, scalar physical registers r1.z and r0.w for points in the program that do not correspond to the vector use point (i.e., points in the program when the store instruction is not being performed). Prior to performing the store instruction, two move operations are inserted into the compiled code to move the two non-adjacent, scalar physical registers (i.e., r1.z, r0.w) that correspond to the vector virtual register used in the store vector store operation to two adjacent physical registers (i.e., r1.x, r1.y) that form a vector physical register. In this way, the vector live interval for the vector virtual register used in the store vector store operation may be reduced, thereby allowing a register allocator greater flexibility to improve the performance of the compiled code.

In some examples, the techniques of this disclosure may be used to order temporaries for a GPU architecture that handles vectors. In further examples, the physical registers (e.g., physical register file) that are allocated to virtual registers (e.g., vector virtual registers) may be included in a GPU.

Register allocation inside of a compiler may, in some examples, need to handle values of different kinds Vector types of various lengths (e.g., as seen from languages like OpenCL™) may be particularly difficult to allocate in architectures where all types share a scalar register file. In such register files, it may be difficult to accommodate larger vectors. If vectors are not allocated properly, this can lead to use of more memory accesses and bad performance.

In some examples, the register allocation techniques of this disclosure may divide vector values (e.g., vector virtual registers) into two categories: (1) MustVec registers; and (2) Mayvec registers. MustVec registers may correspond to values that need to be kept as a vector (e.g., stored in a vector physical register) for correctness. One example of a MustVec register value is a function parameter in a per-function compilation environment. Mayvec registers may correspond to values that may be kept as vectors (e.g., stored in vector physical registers) for higher performance.

In further examples, the register allocation techniques of this disclosure may categorize vector values (e.g., vector virtual registers) into several priorities depending on the performance payback. The performance payback may depend on several factors such as, e.g., the instruction type and location in code. For instance, in some architectures, memory instructions may be more profitable to be kept as a vector then other types of instructions. However, if a program is instruction-dominated, then the profitability may be less. As another example, vectorizing instructions in the innermost part of a loop-intensive code may give the most performance. In some examples, register allocation may proceed in order of priority.

In additional examples, the register allocation techniques of this disclosure may keep track of register pressure to avoid spilling. When spilling is anticipated, one of the following two actions may be performed: (1) splitting of live ranges of high priority vector instructions; and (2) ignoring the priority of low priority values. To split of live ranges of high priority vector instructions, copy instructions (e.g., move instructions) may be inserted around the live ranges (e.g., vector use points) so it may become more possible to allocate the registers. Splitting of live ranges may be particularly useful if the priority is due to load/store instructions. Ignoring the priority of low priority values may correspond to dropping the value and treating it as if there is no priority.

In some examples, assigning one or more physical registers to a virtual register may correspond to assigning the virtual register to the one or more physical registers. Similarly, allocating one or more physical registers to a virtual register may correspond to allocating the virtual register to the one or more physical registers. In further examples, the priority information that is indicative of a relative importance of assigning vector physical registers rather than scalar physical registers to respective vector virtual registers may correspond to priority information that is indicative of a relative importance of assigning respective vector virtual registers to vector physical registers rather than scalar physical registers. Similar correspondences may be made between other allocations and assignments described in this specification.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method comprising:
    enqueuing a plurality of virtual registers;
    selecting a virtual register from the plurality of virtual registers;
    determining that the selected virtual register is a vector virtual register; and
    allocating, with one or more processors, physical registers to the selected vector virtual register based on priority information that is indicative of a relative importance of assigning vector physical registers to the selected vector virtual register versus assigning scalar physical registers to the selected vector virtual register.

2. The method of claim 1, wherein allocating, with the one or more processors, physical registers to the selected vector virtual register comprises:
    determining whether to assign one or more vector physical registers or a plurality of scalar physical registers to the selected vector virtual register based on the priority information.

3. The method of claim 1, wherein allocating, with the one or more processors, physical registers to the selected vector virtual register comprises:
    determining whether to perform vector-scalar live interval splitting for the selected vector virtual register based on the priority information, wherein performance of the vector-scalar live interval splitting for the selected vector virtual register comprises:
        performing the live interval splitting for the selected vector virtual register into a vector live interval and a scalar live interval;
        assigning one or more vector physical registers to the selected vector virtual register during the vector live interval; and
        assigning one or more scalar physical registers to the selected vector virtual register during the scalar live interval.

4. The method of claim 1, wherein allocating, with the one or more processors, physical registers to the selected vector virtual register comprises:
    determining, based on the priority information, whether to spill one or more register live intervals for registers other than the selected vector virtual register into a memory in order to assign a vector physical register to the selected vector virtual register.

5. The method of claim 1 further comprising selecting the virtual register from the plurality of virtual registers based on the priority information.

6. The method of claim 1, wherein allocating, with the one or more processors, physical registers to the selected vector virtual register comprises:
   selecting an action from a set of candidate actions based on the priority information in response to determining that there are no vector physical registers available to assign to the selected vector virtual register; and
   performing the selected action for the selected vector virtual register.

7. The method of claim 6, wherein the set of candidate actions comprises:
   an action that performs vector-scalar live interval splitting for the selected vector virtual register;
   an action that spills register live intervals into a memory in order to assign a vector physical register to the selected vector virtual register; and
   an action that assigns a plurality of scalar physical registers to the selected vector virtual register.

8. The method of claim 7, wherein selecting the action comprises:
   selecting the action based on the priority information and based on impact analysis information that is indicative of an impact on program performance associated with using one or more of the candidate actions.

9. The method of claim 7, wherein selecting the action comprises:
   determining whether vector physical registers rather than scalar physical registers are to be assigned to the selected vector virtual register for correct operation of a program that corresponds to the selected vector virtual registers;
   selecting one of the action that performs vector-scalar live interval splitting and the action that spills other register live intervals as the selected action in response to determining that vector physical registers rather than scalar physical registers are to be assigned to the selected vector virtual register for correct operation of the program;
   determining whether a priority value associated with the selected vector virtual register is greater than or equal to a threshold in response to determining that vector physical registers rather than scalar physical registers are not to be assigned to the selected vector virtual register for correct operation of the program;
   selecting one of the action that performs vector-scalar live interval splitting and the action that spills register live intervals as the selected action in response to determining that the priority value associated with the selected vector virtual register is greater than or equal to the threshold; and
   selecting the action that assigns the plurality of scalar physical registers to the selected vector virtual register in response to determining that the priority value associated with the selected vector virtual register is not greater than or equal to the threshold.

10. The method of claim 9, wherein selecting one of the action that performs vector-scalar live interval splitting and the action that spills other register live intervals comprises:
    determining whether it is possible to perform vector-scalar live interval splitting for the selected vector virtual register;
    selecting the action that performs vector-scalar live interval splitting as the selected action in response to determining that it is possible to perform vector-scalar live interval splitting for the selected vector virtual register; and
    selecting the action that spills register live intervals as the selected action in response to determining that it is not possible to perform vector-scalar live interval splitting for the selected vector virtual register.

11. The method of claim 9, wherein selecting one of the action that performs vector-scalar live interval splitting and the action that spills other register live intervals comprises:
    determining one or more impacts on program performance associated with performing the action that performs vector-scalar live interval splitting and the action that spills other register live intervals; and
    selecting one of the action that performs vector-scalar live interval splitting and the action that spills register live intervals as the selected action based on the determined impacts on program performance.

12. The method of claim 1, wherein the priority information includes a plurality of priority values, each of the priority values being indicative of a relative importance of assigning one or more vector physical registers versus assigning scalar physical registers to a respective one of the plurality of virtual registers.

13. The method of claim 12, further comprising:
    determining the priority values based on one or more of:
      information indicative of whether vector physical registers rather than scalar physical registers are to be assigned to respective vector virtual registers for correct operation of a program that corresponds to the vector virtual registers,
      information indicative of memory access characteristics of a program that corresponds to the vector virtual registers,
      information indicative of a percentage of time spent by a program that corresponds to the vector virtual registers performing memory access instructions,
      information indicative of whether respective vector virtual registers are associated with memory access instructions,
      information indicative of whether respective vector virtual registers are associated with memory access instructions that are included in a loop of a program,
      information indicative of a frequency in which a loop that includes memory access instructions corresponding to respective vector virtual registers is executed, and
      information indicative of improvements in at least one of a metric, power, or a program size that corresponds to the vector virtual registers.

14. A device comprising:
    a memory comprising a queue; and
    one or more processors configured to:
      enqueue a plurality of virtual registers in the queue;
      select a virtual register from the plurality of virtual registers;
      determine that the selected virtual register is a vector virtual register; and
      allocate physical registers to the selected vector virtual register based on priority information that is indicative of a relative importance of assigning vector physical registers to the selected vector virtual register versus assigning scalar physical registers to the selected vector virtual register.

15. The device of claim 14, wherein the one or more processors are further configured to:

determine whether to assign one or more vector physical registers or a plurality of scalar physical registers to the selected vector virtual register based on the priority information.

16. The device of claim 14, wherein the one or more processors are further configured to:
   determine whether to perform vector-scalar live interval splitting for the selected vector virtual register based on the priority information, wherein performance of the vector-scalar live interval splitting for the selected vector virtual register comprises:
      performing the live interval splitting for the selected vector virtual register into a vector live interval and a scalar live interval;
      assigning one or more vector physical registers to the selected vector virtual register during the vector live interval; and
      assigning one or more scalar physical registers to the selected vector virtual register during the scalar live interval.

17. The device of claim 14, wherein the one or more processors are further configured to:
   determine, based on the priority information, whether to spill register live intervals into a memory in order to assign a vector physical register to the selected vector virtual register.

18. The device of claim 14, wherein the one or more processors are further configured to:
   select the virtual register from the plurality of virtual registers in the queue based on the priority information.

19. The device of claim 14, wherein the one or more processors are further configured to:
   select an action from a set of candidate actions based on the priority information in response to determining that there are no vector physical registers available to assign to the selected vector virtual register; and
   perform the selected action for the selected vector virtual register.

20. The device of claim 19, wherein the set of candidate actions comprises:
   an action that performs vector-scalar live interval splitting for the selected vector virtual register;
   an action that spills register live intervals in order to assign a vector physical register to the selected vector virtual register; and
   an action that assigns a plurality of scalar physical registers to the selected vector virtual register.

21. The device of claim 20, wherein the one or more processors are further configured to:
   select the action based on the priority information and based on impact analysis information that is indicative of an impact on program performance associated with using one or more of the candidate actions.

22. The device of claim 20, wherein the one or more processors are further configured to:
   determine whether vector physical registers rather than scalar physical registers are to be assigned to the selected vector virtual register for correct operation of a program that corresponds to the selected vector virtual registers;
   select one of the action that performs vector-scalar live interval splitting and the action that spills other register live intervals as the selected action in response to determining that vector physical registers rather than scalar physical registers are to be assigned to the selected vector virtual register for correct operation of the program;
   determine whether a priority value associated with the selected vector virtual register is greater than or equal to a threshold in response to determining that vector physical registers rather than scalar physical registers are not to be assigned to the selected vector virtual register for correct operation of the program;
   select one of the action that performs vector-scalar live interval splitting and the action that spills register live intervals as the selected action in response to determining that the priority value associated with the selected vector virtual register is greater than or equal to the threshold; and
   select the action that assigns the plurality of scalar physical registers to the selected vector virtual register in response to determining that the priority value associated with the selected vector virtual register is not greater than or equal to the threshold.

23. The device of claim 22, wherein the one or more processors are further configured to:
   determine whether it is possible to perform vector-scalar live interval splitting for the selected vector virtual register;
   select the action that performs vector-scalar live interval splitting as the selected action in response to determining that it is possible to perform vector-scalar live interval splitting for the selected vector virtual register; and
   select the action that spills register live intervals as the selected action in response to determining that it is not possible to perform vector-scalar live interval splitting for the selected vector virtual register.

24. The device of claim 22, wherein the one or more processors are further configured to:
   determine one or more impacts on program performance associated with performing the action that performs vector-scalar live interval splitting and the action that spills other register live intervals; and
   select one of the action that performs vector-scalar live interval splitting and the action that spills register live intervals as the selected action based on the determined impacts on program performance.

25. The device of claim 14, wherein the priority information includes a plurality of priority values, each of the priority values being indicative of a relative importance of assigning one or more vector physical registers versus assigning scalar physical registers to a respective one of the plurality of virtual registers.

26. The device of claim 25, wherein the one or more processors are further configured to determine the priority values based on one or more of:
   information indicative of whether vector physical registers rather than scalar physical registers are to be assigned to respective vector virtual registers for correct operation of a program that corresponds to the vector virtual registers,
   information indicative of memory access characteristics of a program that corresponds to the vector virtual registers,
   information indicative of a percentage of time spent by a program that corresponds to the vector virtual registers performing memory access instructions,
   information indicative of whether respective vector virtual registers are associated with memory access instructions,
   information indicative of whether respective vector virtual registers are associated with memory access instructions that are included in a loop of a program,
   information indicative of a frequency in which a loop that includes memory access instructions corresponding to respective vector virtual registers is executed, and information indicative of improvements in at least one of a metric, power, or a program size that corresponds to the vector virtual registers.

27. The device of claim 14, wherein the device comprises one of a wireless communication device or a mobile phone handset.

28. The device of claim 14, wherein the device further comprises the physical registers.

29. An apparatus comprising:
    means for enqueuing a plurality of virtual registers;
    means for selecting a virtual register from the plurality of virtual registers;
    means for determining that the selected virtual register is a vector virtual register;
    means for obtaining priority information that is indicative of a relative importance of assigning vector physical registers to the selected vector virtual register versus assigning scalar physical registers to the selected vector virtual register; and
    means for allocating physical registers to the selected vector virtual register based on the priority information.

30. A non-transitory computer readable storage medium comprising instructions that upon execution by one or more processors cause the one or more processors to:
    enqueue a plurality of virtual registers;
    select a virtual register from the plurality of virtual registers;
    determine that the selected virtual register is a vector virtual register; and
    allocate physical registers to the selected vector virtual register based on priority information that is indicative of a relative importance of assigning vector physical registers to the selected vector virtual register versus assigning scalar physical registers to the selected vector virtual register.

* * * * *